C. A. CHERTEMPS.
RESILIENT WHEEL FOR VEHICLES.
APPLICATION FILED JAN. 24, 1910.

998,748.

Patented July 25, 1911
2 SHEETS—SHEET 1.

C. A. CHERTEMPS.
RESILIENT WHEEL FOR VEHICLES.
APPLICATION FILED JAN. 24, 1910.

998,748.

Patented July 25, 1911.

2 SHEETS—SHEET 2.

Witnesses:-

Inventor:-
Charles Aimé Chertemps
by B. Singer
Attorney:-

UNITED STATES PATENT OFFICE.

CHARLES AIMÉ CHERTEMPS, OF SOISY-SOUS-MONTMORENCY, FRANCE.

RESILIENT WHEEL FOR VEHICLES.

998,748.  Specification of Letters Patent.  Patented July 25, 1911.

Application filed January 24, 1910. Serial No. 539,786.

*To all whom it may concern:*

Be it known that I, CHARLES AIMÉ CHERTEMPS, citizen of the Republic of France, residing at Soisy - sous - Montmorency, in France, have invented new and useful Improvements in or Relating to Resilient Wheels for Vehicles, of which the following is a specification.

This invention relates to elastic wheels for vehicles of all kinds and has for its object to increase the elasticity of the wheel, by means of suitable devices protected against dust, water and dirt.

Figure 1:
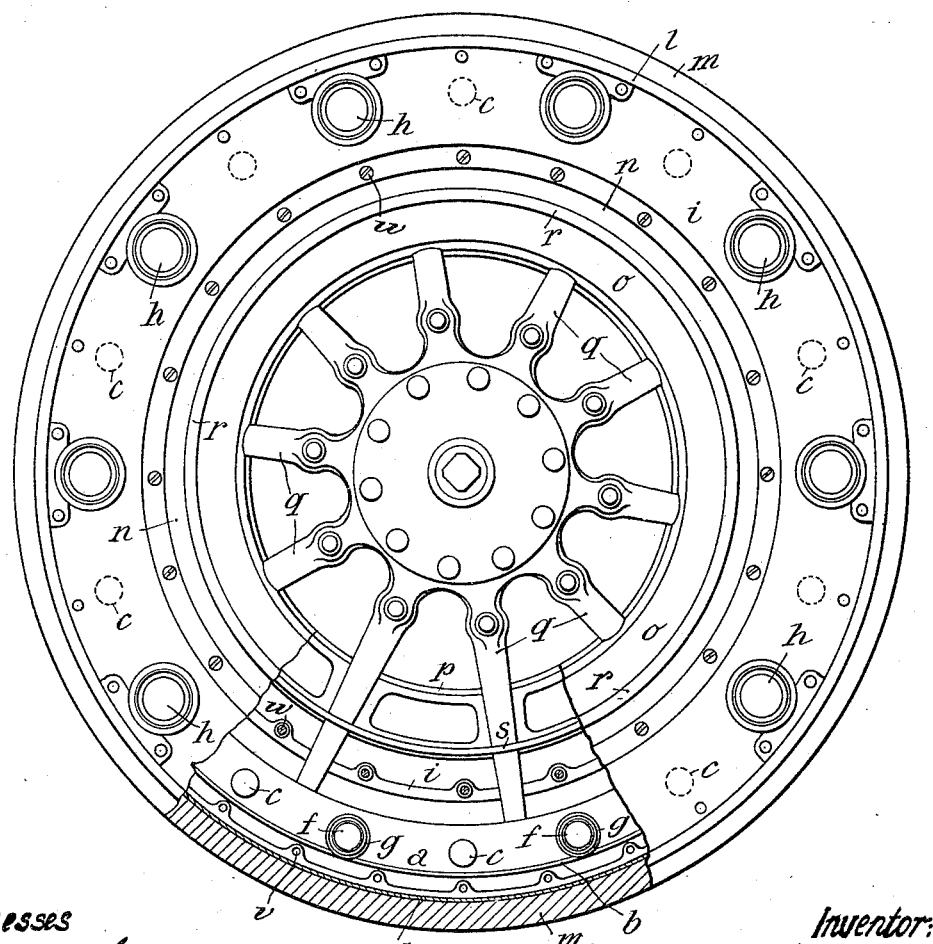
Figure 2:
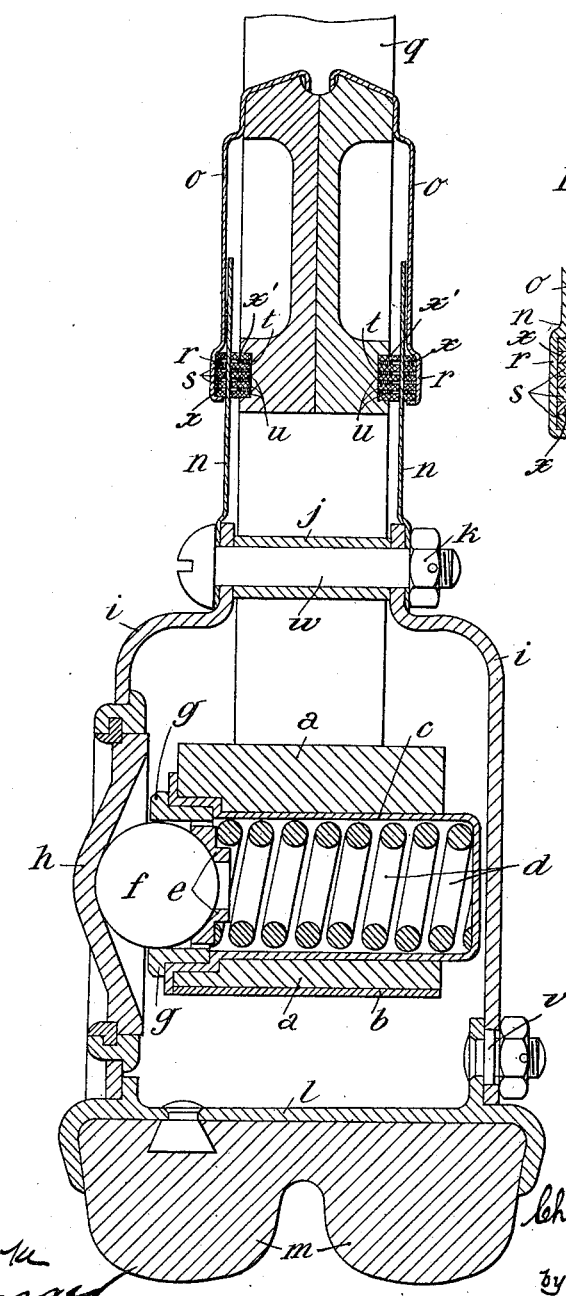
Figure 3:
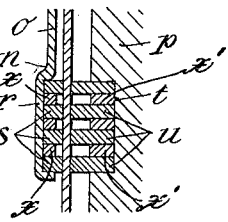

In the accompanying drawing, Figure 1 is a front elevation of the improved wheel with part of the felly broken away to show the arrangement of the interior parts. Fig. 2 is a cross-section through the rim and the mechanism of the wheel on an enlarged scale, and also of the water-tight joints between the fixed and the movable portions of the wheel. Fig. 3 is a sectional detailed view showing on an enlarged scale the arrangement of the elastic packing rings.

The improved wheel comprises a stationary wooden rim $a$ provided on its periphery with a steel hoop $b$ and at certain intervals with holes in each of which is placed a metal socket $c$ opening toward one side. The said socket contains a helical spring $d$ acting on a small cup $e$ forming a seat for a ball $f$ which is guided by a small socket $g$ engaging one of the ends of the socket $c$. Opposite each ball $f$ the movable rim is provided with a conical cup $h$ suitably secured to the same. This rim consists of two symmetrical rings $i$ braced at certain intervals by sockets or tubes $j$ which keep the said rings at the proper distance apart, and the rings are connected by means of bolts $w$ passing through the sockets $j$ and secured by nuts $k$. The two rings $i$ are connected at their outside circumference by means of the movable metal rim proper $l$, provided with a rubber tire $m$. The said rim $l$ is bolted as at $v$ to the rings $i$ as clearly shown in Fig. 2 of the drawing. The balls $f$ are arranged alternately facing the faces of the wheel and each spring $d$ acts only on one of them so that the spring in question can be made of greater length and consequently more elasticity can be given to the system than if one ball only were arranged at each end of the spring. The cups $h$ may obviously be arranged in a similar manner alternately either at the inner or at the outer face of the movable rims, or alternately on one or the other of the rings $i$ forming said rim. It will be understood when such a wheel rotates on the ground and is weighted down, that the outer rim will become eccentric in relation to the inner rim and the cups $h$ will then act on the balls $f$ forcing them back and compressing the springs $d$ which consequently will have the tendency to resist the displacement of the outer rim and to take up the shocks and vibrations communicated to said rim.

Each of the rings $i$ has an inner extension in the form of a thinner flat ring $n$ which can move freely within another ring $o$ in its proximity and which is secured to a wooden ring $p$ connecting the spokes $q$ to the felly of the wheel. The outer edge of each ring $o$ is formed with an annular recess $r$ in which are edgewise arranged the rings $s$ preferably of paraffined felt separated by similar rings $x$ made of cardboard. The wooden ring $p$ is provided at each side with recesses or depressions $t$ in which are arranged in the same manner rings $u$ also made of paraffined felt and also separated by cardboard rings $x'$. In this way each flat ring $n$ is engaged by the two series of rings $s$ and $u$ between which it can freely move, and this device which is shown on an enlarged scale in Fig. 3 serves to prevent dust, water and dirt from getting between the rings $n$ and consequently between the rings $i$.

It is evident it is not absolutely necessary to use paraffined felt for obtaining a tight joint between the movable and the fixed portions of the wheel and that I may use any other suitable material without deviating from the scope of the present invention. It is also to be understood that changes may be made in the shape, proportions and arrangement of the parts forming the object of the present invention without departing from the scope of the said invention.

Having thus described my invention what I claim is:—

1. In a resilient wheel, a stationary rim, metal sockets within said rim open toward one side, helical springs within said sockets, guide members carried by said sockets, cups guided within said members and engaged by said springs to normally force the cups outwardly, balls within said cups, and a movable rim consisting of two symmetrical rings, thin flat rings forming an extension of the rings constituting the movable rim, another ring within which said flat rings can freely move and a wooden ring to which said latter ring is secured adapted to be connected with the spokes to the wheel, substantially as described and for the purpose set forth.

2. In a resilient wheel, a stationary rim, and a movable rim consisting of a tread and two symmetrical rings, yielding means between said rims, thin flat rings forming an extension of the rings constituting the movable rim, another ring within which said flat rings can freely move, having its outer edge formed with an annular recess, paraffined felt rings edgewise arranged within said recess and cardboard rings separating the felt rings and a wooden ring to which the ring containing said felt rings is secured, recesses in said wooden ring, paraffined felt rings within said recess and cardboard rings separating said felt rings, substantially as described and for the purpose set forth.

3. A resilient wheel comprising, a stationary rim, sockets, open at one end, alternately spaced about and carried by said rim with the said open ends in the plane of the wheel, cup bearings guided within said sockets, means normally forcing said bearings outwardly with respect to said sockets, balls carried by said bearings, a movable rim comprising a tread and annular members carrying ball-bearing sockets for coaction with said balls, and means securing said movable rim and said stationary rim in operative relation to each other with movement therebetween, combined substantially as described.

In testimony whereof I have affixed my signature, in presence of two subscribing witnesses.

CHARLES AIMÉ CHERTEMPS.

Witnesses:
 DEAN B. MASON,
 P. PLUCINSKI.

---

Copies of this patent may be obtained for five cents each, by addressing the "Commissioner of Patents. Washington, D. C."